May 1, 1951 — L. A. MINTON — 2,551,450
CONTAINER
Filed Dec. 3, 1947
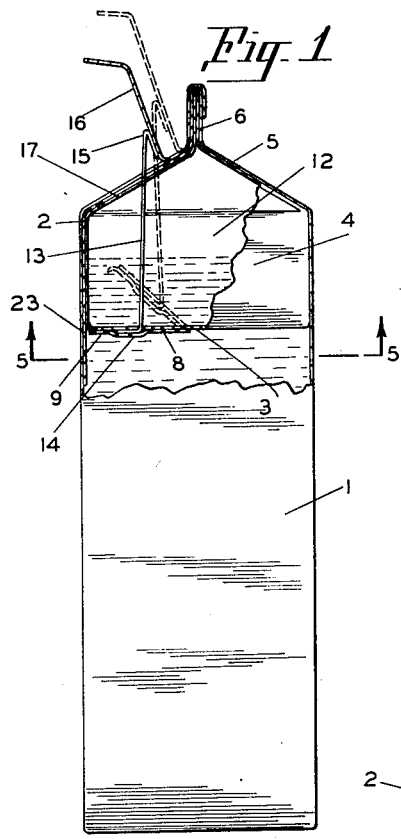
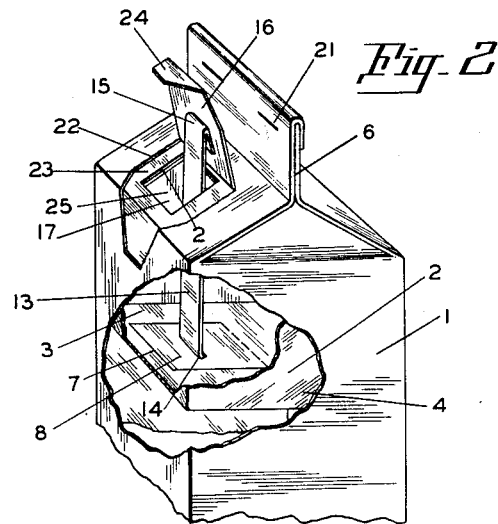
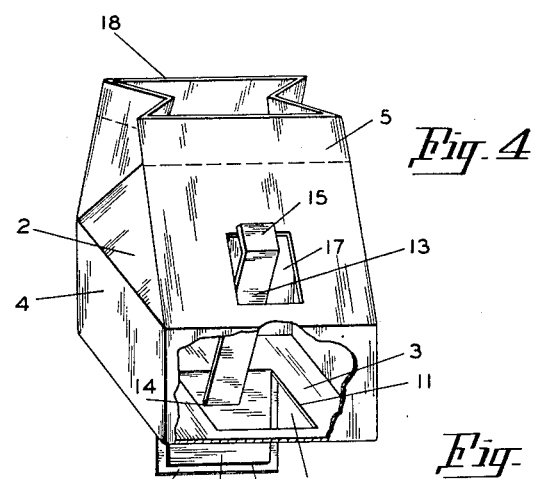
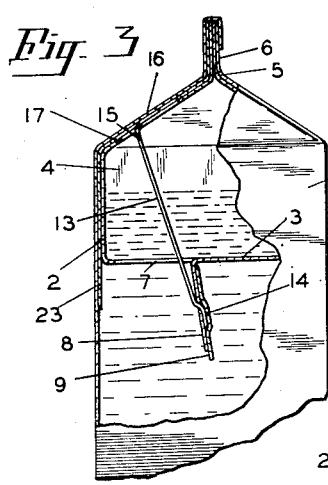
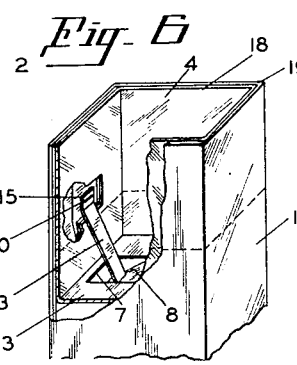
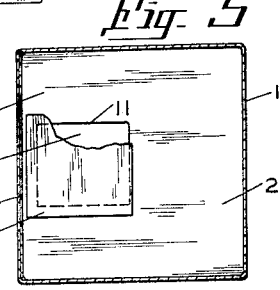
INVENTOR.
LESLIE A MINTON
BY
ATTORNEY Patented May 1, 1951

2,551,450

UNITED STATES PATENT OFFICE 2,551,450

CONTAINER

Leslie A. Minton, Portland, Oreg.

Application December 3, 1947, Serial No. 789,377

2 Claims. (Cl. 229—7)

This invention relates to liquid containers and is particularly adapted for containing milk.

The primary object of the invention is to provide a container wherein the cream and the milk are separated within the carton previous to pouring the contents therefrom.

A further object of the invention is to employ a principle of separating the cream from the milk wherein the device to be employed may be inserted in a standard carton at the time of filling.

A still further object is to employ the above principle where the same is built into the carton at the time of manufacture.

And a still further object of the invention is the employing of the principle of pouring wherein both the cream and milk can be poured simultaneously.

These and other incidental objects will be apparent in the drawings, specification and claims.

In the drawings:

Figure 1 is a side view of my new and improved milk carton, partially broken away, showing the separator gate in closed position separating the cream from the milk.

Figure 2 is a detail fragmentary view illustrating the position of the gate and pouring spout corresponding to Figure 1.

Figure 3 is a fragmentary detail view illustrating the gate in open position, the carton sealed, the cream and the milk communicating with one another.

Figure 4 is a perspective detail view partially broken away of the insert unit comprising the pouring spout and the gate, the gate shown in open position as illustrated in Figure 3.

Figure 5 is an inverted sectional plan view taken on lines 5—5 of Figure 1, particularly made to illustrate the gate structure from underneath.

Figure 6 is a fragmentary perspective detail view illustrating the upper portion of a carton having the insert unit installed therein, parts broken away for convenience of illustration.

Referring more specifically to the drawings:

My new and improved milk carton consists of a container 1 having an insert unit 2. The unit 2 consists of a bottom 3 and side walls 4 having folded upper portions 5 corresponding to the upper folding portion 6 of the container 1. Located in the bottom 3 is an opening 7 having a closure gate 8 forming part of the bottom 3 and having a projecting ledge 9 extending slightly beyond the edge 10 of the gate around its three sides and overlapping the edges 11 of the opening 7 when the gate is closed.

The object of this ledge is to prevent the milk from entering the cream chamber 12 while the cream is being poured from the container. The gate 8 is opened by a connecting and operating member 13, the lower end of which is secured at 14 to the gate and its opposite end 15 is secured to the closure lid 16 formed from the top 6 of the container 1. An opening 17 is formed in the upper portion 5 of the insert unit 2 and has no cover except when the insert is located in the container 1. The closure lid 16 remains sealed relative to the container 1 until the customer opens the same for pouring the contents therefrom.

I will now describe the operation of my new and improved liquid carton container. The insert unit 2 is dropped down into the top of the carton or container before the upper portion 6 of the carton is folded, the top 18 of the unit 2 comes even with the top 19 of the container, referring to Figure 6. The upper end 15 of the gate operating member 13 is brought against the inner side of the cover 16 and secured thereto by any suitable means, as for instance by a sanitary staple 20, next the upper portion 5 of the insert unit 2 and the upper portion 6 of the container 1 are folded as illustrated together and stapled by the staples 21, this binds the whole assembly together preferably at the bottling plant after the milk has been put into the carton, thereby eliminating any interferences in the filling of the carton with milk or liquid.

I do not wish to be limited to the exact structure as illustrated in the using of an insert, as a partition could be substituted for the bottom 3 being built into the carton at the source of manufacture, still carrying out the objects of my invention.

The lid 16 is perforated along the lines 22 of the carton and is sealed against a ledge 23 forming part of the upper end 6 of the carton. When the customer receives the carton he raises the tip 24 of the cover 16 and pulls the same up to the position illustrated in Figures 1 and 2. This closes the gate 8 as illustrated in these figures and at the same time opens the pouring orifice 25 so that the cream contained within the chamber 12 can be poured without pouring the milk through the gate with the cream.

In order to pour the milk the lid 16 is further pulled to the dotted position illustrated in Figure 1, pulling the gate up through the opening 17 permitting the milk to be poured through the opening out the pouring orifice 25. The ledge 9 of the gate 8 is made flexible enough to pull through the opening with ease.

During the time between the filling of the bottles and when the same are opened the gate 8 remains open as illustrated in Figures 3 and 4 permitting the separation of the cream from the milk, the cream entering into the compartment 12. By pulling the lid 16 to the dotted position before the cream is removed and by opening the gate 8 allowing the milk to pass through the opening 17 both the cream and the milk can be poured at the same time, carrying out a further object of my invention.

I do not wish to be limited to the exact mechanical structure as other mechanical equivalents may be substituted still coming within the scope of my claims.

That which is claimed as new is:

1. A milk carton comprising an upright carton having a pouring opening at the top, a closure element for closing said opening and movable outwardly to uncover said opening, a partition across said carton at a point between the cream and milk sections thereof, an opening in said partition for communication between the sections, a closure element for selectively closing said partition opening to completely separate said sections and normally movable downwards to uncover said partition opening, and a substantially rigid link hingedly connected to and extending between said closure elements and of a length to hold said partition closure down in open position when said carton closure is closed and to close said partition opening when said carton closure is moved to normal open position.

2. A cream carton for insertion in a milk carton of the upstanding rectangular type with a pouring opening in the top and an outwardly swinging closure for said opening, said cream carton comprising a rectangular carton to fit concentrically with the top of a milk carton, said cream carton having a free pouring opening in its top and positioned to coincide with the pouring opening of a milk carton, an opening in the bottom of said cream carton for communication with the bottom portion of a surrounding milk carton, a closure member for said bottom opening, and a substantially rigid link hingedly secured to the top of said bottom closure member and of a length to be hingedly secured to the milk carton closure and extend through said pouring opening to the normal open position of the milk carton closure when said bottom closure member is closed.

LESLIE A. MINTON.

REFERENCES CITED

The following references are of record in the file of this patent:

UNITED STATES PATENTS

| Number | Name | Date |
| --- | --- | --- |
| 2,324,670 | Bergen | July 20, 1943 |
| 2,369,322 | Steen | Feb. 13, 1945 |